United States Patent
Karunakaran et al.

(10) Patent No.: US 9,582,610 B2
(45) Date of Patent: Feb. 28, 2017

(54) VISUAL POST BUILDER

(71) Applicant: Microsoft Corporation, Redmond, WA (US)

(72) Inventors: Rajeev Karunakaran, Redmond, WA (US); Richard I. Zaragoza, Sammamish, WA (US); Steven W. Ickman, Snoqualmie, WA (US); Richard D. Marshall, Bellevue, WA (US); David A. Raskino, Kirkland, WA (US); William L. Portnoy, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 723 days.

(21) Appl. No.: 13/831,762

(22) Filed: Mar. 15, 2013

(65) Prior Publication Data

US 2014/0280054 A1   Sep. 18, 2014

(51) Int. Cl.
   *G06F 17/30* (2006.01)

(52) U.S. Cl.
   CPC .. *G06F 17/30991* (2013.01); *G06F 17/30274* (2013.01)

(58) Field of Classification Search
   CPC .. G06F 3/04845; G06F 17/243; G06F 3/0484; G06F 3/04842; G06F 3/1242; G06F 3/048; G06F 17/3089; G06F 17/30056; G06F 17/211; G06F 17/24; G06F 17/248; G06F 17/30991; G06F 17/30274; G06F 3/0483; G06F 3/0486; H04N 1/00456; G06K 9/00463; G06T 3/00; G06T 11/00; G06T 3/40; G06T 11/60

USPC ......................................................... 707/722

See application file for complete search history.

(56) References Cited

U.S. PATENT DOCUMENTS

| 7,249,123 | B2 | 7/2007 | Elder et al. |
| 7,676,505 | B2 | 3/2010 | Chess et al. |
| 9,195,757 | B2 | 11/2015 | Portnoy et al. |
| 2004/0098360 | A1 | 5/2004 | Witwer et al. |
| 2005/0044485 | A1* | 2/2005 | Mondry ................. G06T 11/60 715/247 |
| 2005/0243381 | A1* | 11/2005 | Hill ..................... H04N 1/00132 358/453 |
| 2006/0112111 | A1 | 5/2006 | Tseng et al. |
| 2006/0279566 | A1* | 12/2006 | Atkins .................. G06F 17/211 345/418 |

(Continued)

OTHER PUBLICATIONS

Berg, Daniel., "So.cl Review", Retrieved at <<http://www.laptopmag.com/review/webservices/socl.aspx>>, Jun. 13, 2012, pp. 4.

(Continued)

*Primary Examiner* — Evan Aspinwall
(74) *Attorney, Agent, or Firm* — Steve Wight; Sandy Swain; Micky Minhas

(57) ABSTRACT

The description relates to visual post builders. One example can receive a user search topic relating to a collage. This example can concurrently present a collage template and search results for the search topic. The collage template can be manifest as a grid of equal sized rectangles. The example can automatically populate a user selection from the search results into one or more rectangles of the collage template. The example can also automatically populate additional user selections into remaining rectangles of the collage template until all of the rectangles of the collage template are populated or the user indicates that the collage is complete.

20 Claims, 14 Drawing Sheets

(56) References Cited

U.S. PATENT DOCUMENTS

| | | | |
|---|---|---|---|
| 2006/0282303 | A1 | 12/2006 | Hale et al. |
| 2007/0276676 | A1 | 11/2007 | Hoenig et al. |
| 2008/0005072 | A1 | 1/2008 | Meek et al. |
| 2008/0144107 | A1 | 6/2008 | Lieb |
| 2008/0193048 | A1 | 8/2008 | Sun et al. |
| 2008/0222560 | A1* | 9/2008 | Harrison .............. G06F 3/04847 715/800 |
| 2009/0094525 | A1 | 4/2009 | Coelius et al. |
| 2010/0005379 | A1 | 1/2010 | Lanahan et al. |
| 2010/0205541 | A1 | 8/2010 | Rapaport et al. |
| 2010/0217641 | A1 | 8/2010 | Siegel |
| 2010/0290705 | A1* | 11/2010 | Nakamura .............. G06T 11/60 382/173 |
| 2010/0299325 | A1 | 11/2010 | Tzvi et al. |
| 2010/0325107 | A1 | 12/2010 | Kenton et al. |
| 2011/0016407 | A1 | 1/2011 | Nelson |
| 2011/0184950 | A1* | 7/2011 | Skaff ................ G06F 17/30265 707/737 |
| 2011/0202557 | A1 | 8/2011 | Atsmon |
| 2011/0225179 | A1* | 9/2011 | Cheng ................ G06F 17/3028 707/769 |
| 2011/0258556 | A1 | 10/2011 | Kiciman et al. |
| 2012/0290566 | A1* | 11/2012 | Dasher .............. G06F 17/30244 707/723 |
| 2013/0033634 | A1* | 2/2013 | Sudheendra ............ G06T 11/60 348/333.05 |
| 2014/0096041 | A1* | 4/2014 | Gowen ................ G06F 3/0484 715/753 |
| 2014/0307980 | A1* | 10/2014 | Hilt ........................ G06T 11/60 382/284 |

OTHER PUBLICATIONS

"Microsoft So.cl Gives Students a New Way to Learn", Retrieved at <<http://www.cdrinfo.com/sections/news/Details.aspx?NewsId=31907>>, Dec. 15, 2011, pp. 2.

Greenberg, et al., "The Notification Collage: Posting Information to Public and Personal Displays", Retrieved at <<http://www.idi.ntnu.no/emner/tdt12/greenberg-groupware.pdf>>, Proceedings of the SIGCHI Conference on Human Factors in Computing Systems, Mar. 31, 2001, pp. 8.

Kerne, Andruid., "CollageMachine—An Interactive Agent of Web Recombination", Retrieved at <<http://ecologylab.net/research/publications/andruidLeonardo33-5.PDF>>, MIT Press Journals—Leonardo, vol. 33, No. 5, Oct. 2000, pp. 4.

Panjwani, et al., "Collage: A Presentation Tool for School Teachers", Retrieved at <<http://research.microsoft.com/pubs/135480/Collage-final-v2.pdf>>, Proceedings of the 4th ACM/IEEE International Conference on Information and Communication Technologies and Development, Dec. 13, 2010, pp. 10.

Kiciman, Etnre, "Implicit Search of Social Network Data to Discover Collaborative Search Opportunities," retrieved at <<http://workshops.fxpal.com/cscw2010cis/submissions/tmp26.pdf>>, 2010, 4 pages.

Mislove et al., "Exploiting Social Networks for Internet Search," Proceedings of the 5th Workshop on Hot Topics in Networks, 2006, pp. 79-84, 6 pages.

Non-Final Office Action mailed Oct. 30, 2012 from U.S. Appl. No. 13/098,486, 19 pages.

Response filed Feb. 6, 2013 to the Non-Final Office Action mailed Oct. 30, 2012 from U.S. Appl. No. 13/098,486, 15 pages.

Final Office Action mailed Feb. 28, 2013 from U.S. Appl. No. 13/098,486, 20 pages.

Response filed Jun. 13, 2013 to the Final Office Action mailed Feb. 28, 2013 from U.S. Appl. No. 13/098,486, 15 pages.

Non-Final Office Action mailed Sep. 3, 2014 from U.S. Appl. No. 13/098,486, 28 pages.

Response filed Dec. 3, 2014 to the Non-Final Office Action mailed Sep. 3, 2014 from U.S. Appl. No. 13/098,486, 14 pages.

Notice of Allowance mailed Jul. 30, 2015 from U.S. Appl. No. 13/098,486, 8 pages.

* cited by examiner

VISUAL POST BUILDER

BACKGROUND

In some scenarios a user has an idea or a concept they would like to express with visual imagery. With current tools, users are forced into additional roles to accomplish the goal. For instance, the user has to assume the role of librarian of source media. The user then has to assume the role of designer to maintain the visual configuration and layout of these source media on a page. For example, a user can create a slide in PowerPoint® that brings together images on a topic, but the user is forced to collect these images into his/her file system, and use complex tools to crop, size, etc. The user also has to arrange the images based on the images' individual attributes, and find how to fit in other media (such as text or web links or videos) into a blank canvas with a limited variety of templates. The learning curves for these tools are large, and the tools don't allow for the in-line sourcing of content from the internet. It's expected that the creation of a slide deck is a labor-intensive process that will take a minimum of many minutes. These content creation tools are also based on static sets of imagery and videos, rather than content derived from the immediacy of the moment and social interactions.

SUMMARY

The described concepts relate to visual post builders. Visual posts can be manifest as collages or montages. One example can receive a user search topic relating to a collage. This example can concurrently present a collage template and search results for the search topic. The collage template can be manifest as a grid of equal sized rectangles. The example can automatically populate a user selection from the search results into one or more rectangles of the collage template. The example can also automatically populate additional user selections into remaining rectangles of the collage template until all of the rectangles of the collage template are populated or the user indicates that the collage is complete.

Another example can define a collage as a grid of rectangles. The example can receive user-selected media for the collage. The example can also determine a location in the grid of rectangles to position the user-selected media and a number of the rectangles to occupy with the user selected media in the collage.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent relates to visual post builders. In some implementations the visual post can be described as a collage or montage. For ease of discussion, the terms 'visual post', 'collage', and 'montage' are used interchangeably in this document. The visual post builder can facilitate user creation and viewing of visual posts. The visual post builder can define a collage as a grid of rectangles. The user can enter a topic and the visual post builder can provide media for the topic, such as images, video, and/or text. The user can select any of the media and the visual post builder can automatically populate the selected media into the grid of rectangles for the user. The visual post builder can populate one or more of the rectangles with the selected media. Thus, by simply entering a topic and selecting some results the user can create a visually appealing collage.

Scenario Examples

For purposes of explanation consider FIGS. 1-8 which collectively show a computing device 102 in several consecutive instances. In this example, computing device 102 is manifest as a pad type mobile computing device that has a display 104. The computing device 102 can be configured to present a graphical user interface (GUI) 106 on the display 104.

While a pad type mobile computing device is illustrated, the concepts apply to other types of computing devices, such as notebook computers, desktop computers, smart phone type computers, and/or entertainment/gaming consoles, among others. For purposes of explanation, assume that computing device 102 belongs to a user named "Jose".

In this example, the GUI 106 relates to visual posts. In this case, the visual posts are manifest as two visual posts 108(1) and 108(2). Visual post 108(1) includes three images and a caption below the images. Visual post 108(2) includes a video with a caption superimposed over the video. The user can click a 'play' arrow to view the video. Other visual posts are described below.

In the illustrated configuration, the user is offered various visual post tools relating to which visual posts are presented and in which order as indicated generally at 110. For instance, the user can sort visual posts by 'interests', 'people' (e.g., view visual posts by particular people), 'newest', etc. Alternatively, the user can scroll to see other visual posts. For purposes of explanation, assume that at this point the user wants to create a new collage. Toward this end the user can enter text (e.g., search term(s)) in text window 112 or an alternative action area.

Figure 1:
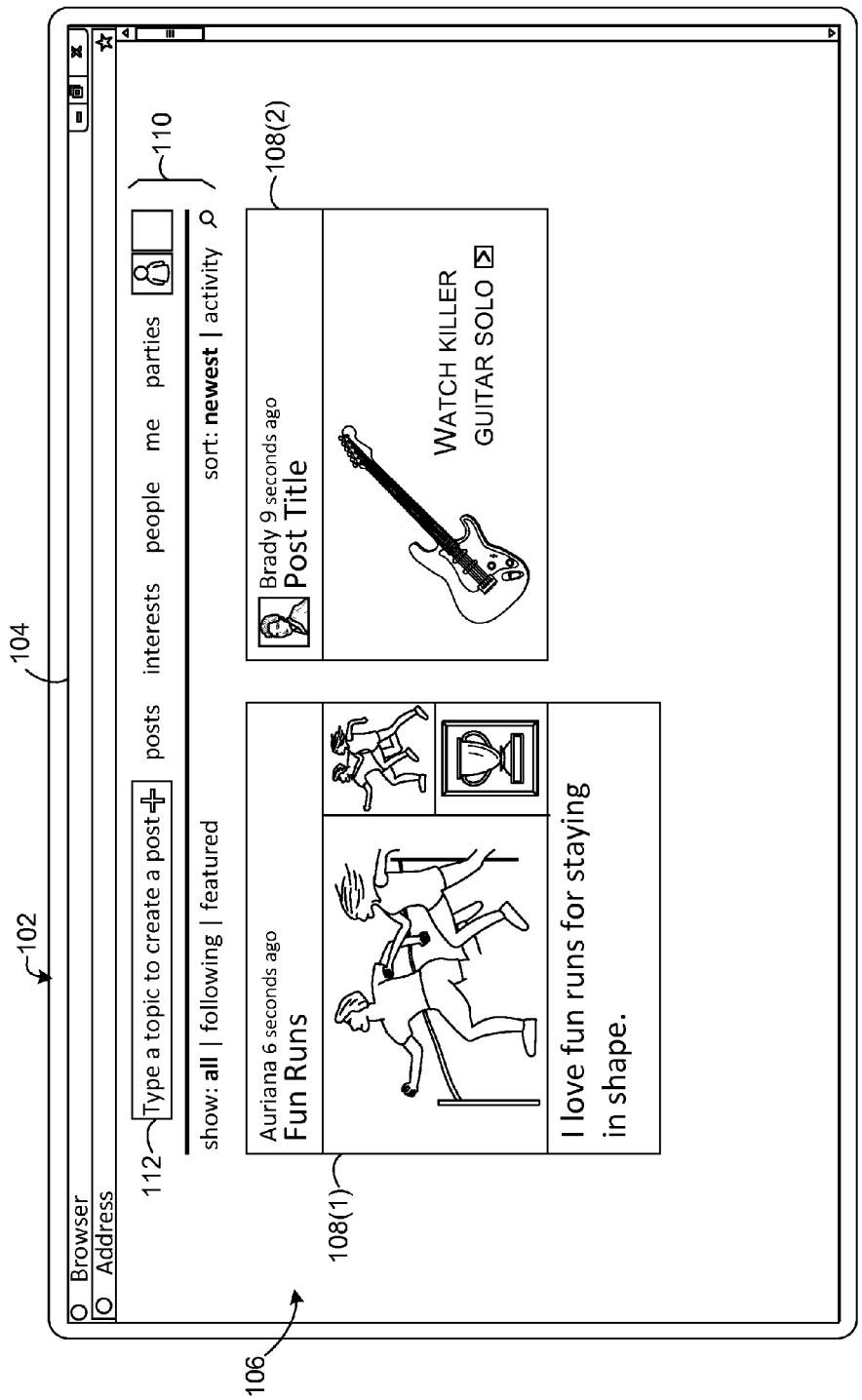
FIGS. 1-11 illustrate visual post building concepts on a computing device in accordance with some implementations of the present concepts.
Figure 2:
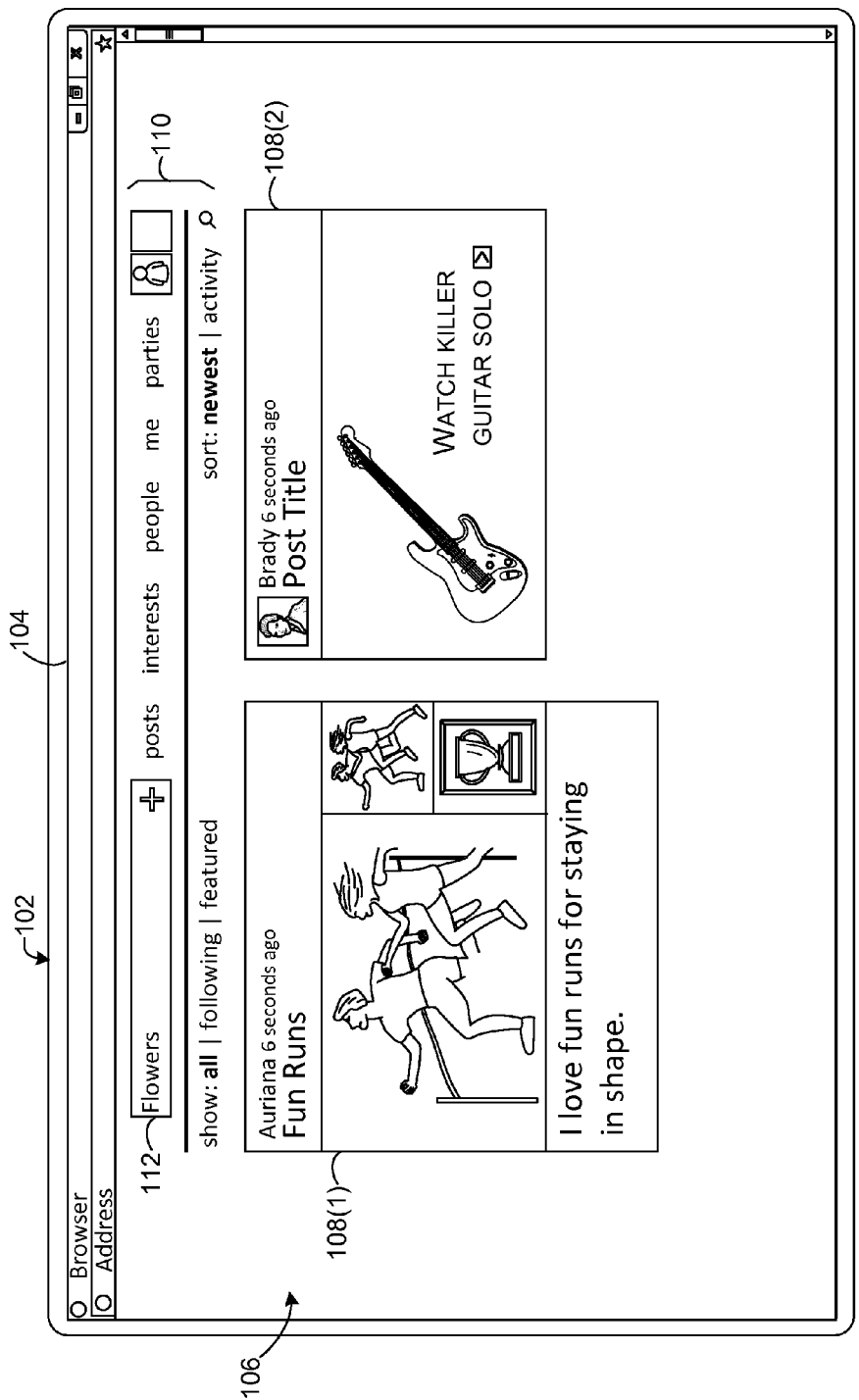

FIG. 2 shows GUI 106 where the user has entered the search term 'flowers' in text window 112 as a search query.

Figure 3:
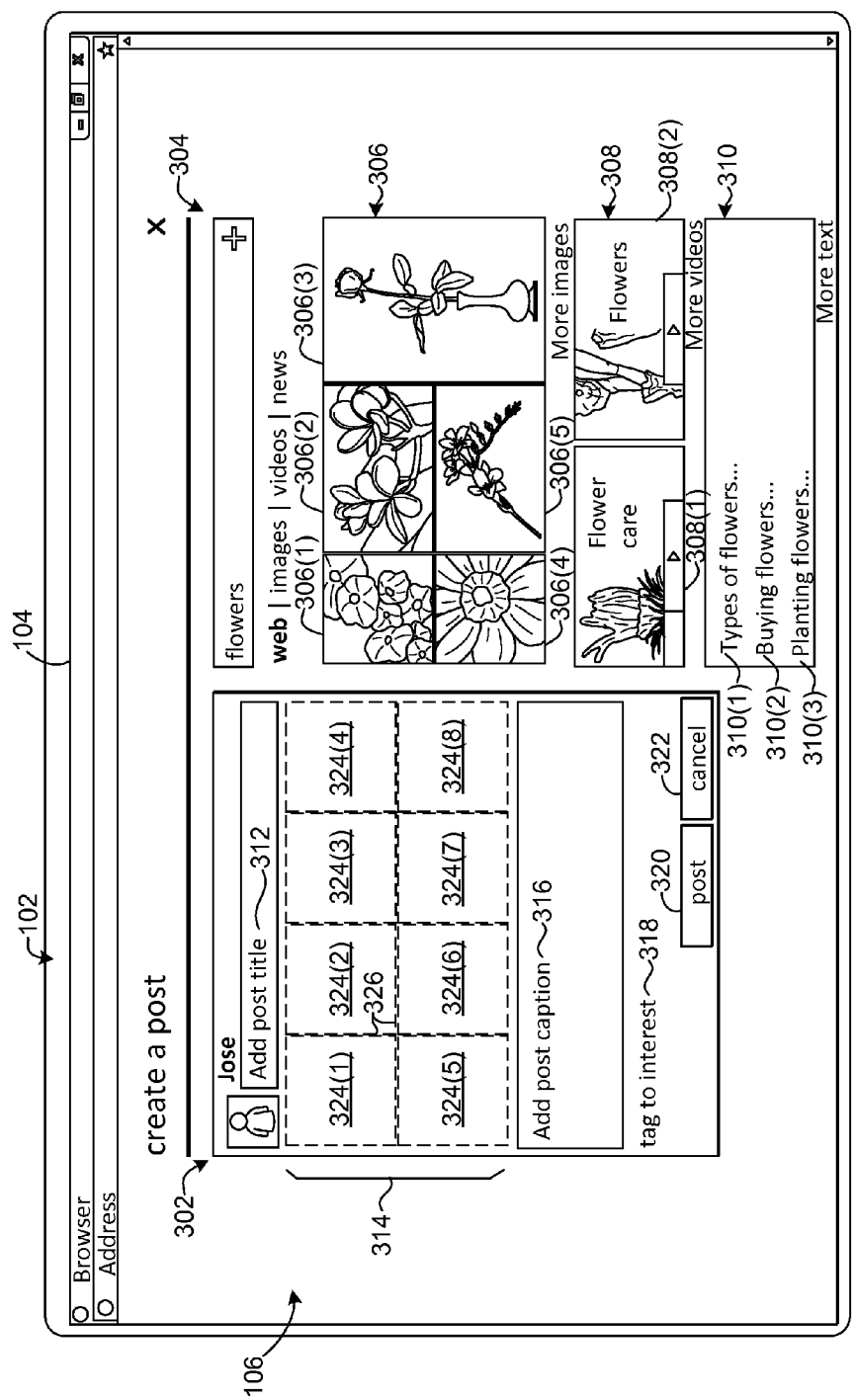

FIG. 3 shows GUI 106 updated to show a draft visual post 302 and search results 304 generated responsive to the user search query 'flowers'. The draft visual post 302 and the search results 304 can be presented concurrently so the user can select items from the search results to populate the draft visual post. In this example, the draft visual post and the search results are presented side-by-side, but other configurations are also contemplated.

In this example, the search results 304 are organized into images 306, video 308, and text 310. Each section can include multiple entries and can allow the user to view more entries (e.g., more images, more video, or more text).

In this case, the draft visual post can include a visual post title section 312, a collage template section (hereinafter, "collage template") 314, a visual post caption section 316 and a tag section 318. Ultimately, the user can either post the draft visual post at 320 (as a visual post) or cancel the process at 322.

Note that in this implementation, the collage template 314 is defined by a number of rectangles 324 arranged in a grid indicated generally at 326. (These rectangles 324 may or may not be evidenced on the GUI, but are shown here for purposes of explanation). In the illustrated configuration, there are eight rectangles 324(1)-324(8). The rectangles are arranged in two horizontal rows of four each (e.g., rectangles 324(1)-324(4) define the first row and rectangles 324(5)-324(8) define the second row). Briefly, for purposes of this example, assume that the rectangles are squares. Details about the rectangles are described below relative to FIG. 11.

Figure 4:
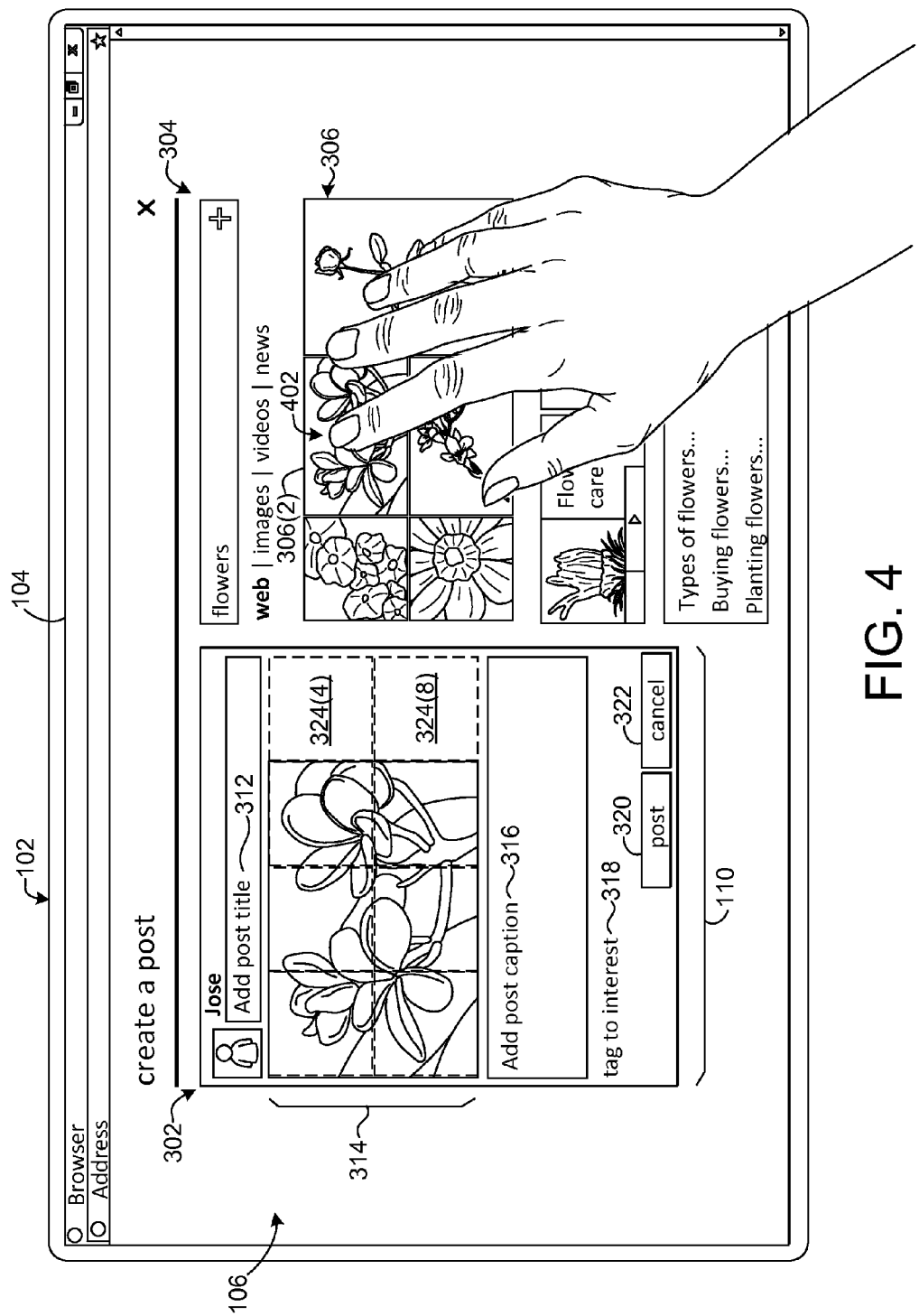

FIG. 4 shows the user selecting an individual search result image 306(2) at 402. The individual search result is automatically populated into collage template 314. This particular implementation can populate the first selected item from the search results onto multiple rectangles 324. This particular implementation also tends to populate from left to right and top to bottom. Other configurations are described below relative to FIG. 11.

In this case, a decision regarding which rectangles 324 to populate can be based upon an aspect ratio of the selected item (e.g., image 306(2)). In this case, the aspect ratio of the selected item is similar to an aspect ratio of three rectangles wide by two high. This particular implementation can start populating at the upper left rectangle (e.g., rectangle 324 (1)). So, in this case, the image is populated into six of the rectangles 324 (e.g., 324(1)-324(3) on the first row and 324(5)-324(7) on the second row). (Of course, while the rectangles are shown through the image here for purposes of explanation, the rectangles would likely not be shown through the image in practice).

Figure 5:
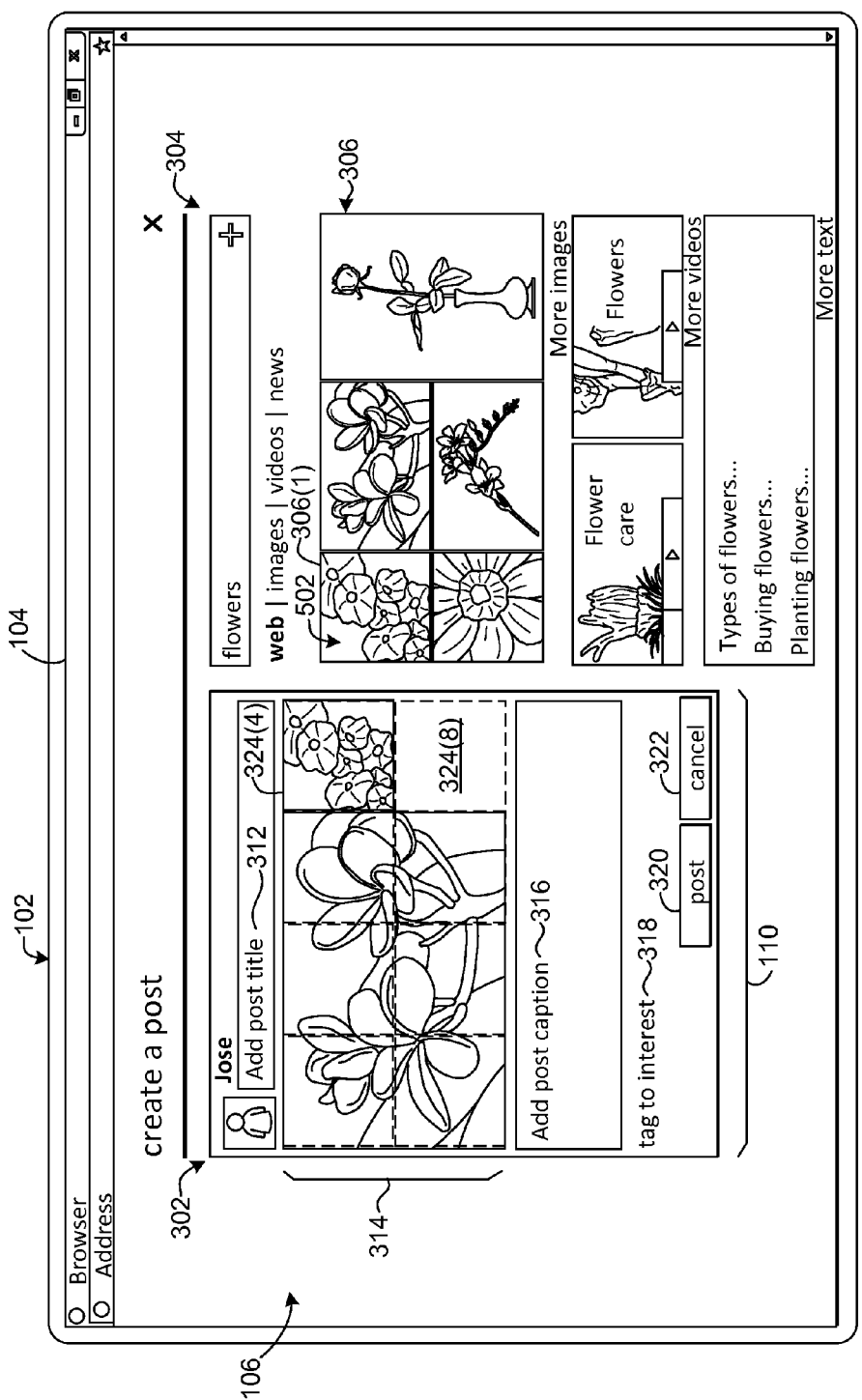

FIG. 5 shows another user selection 502 of image 306(1). The selected image is populated into rectangle 324(4) of the collage template 314. As mentioned above, this implementation tends to populate from left to right and top to bottom. The aspect ratio of the selected image is similar to the aspect ratio of rectangle 324(4) on the top row so the image is positioned over the rectangle 324(4). Stated another way, rectangle 324(4) can be considered the first available rectangle following the left-to-right, top-to-bottom layout.

Figure 6:
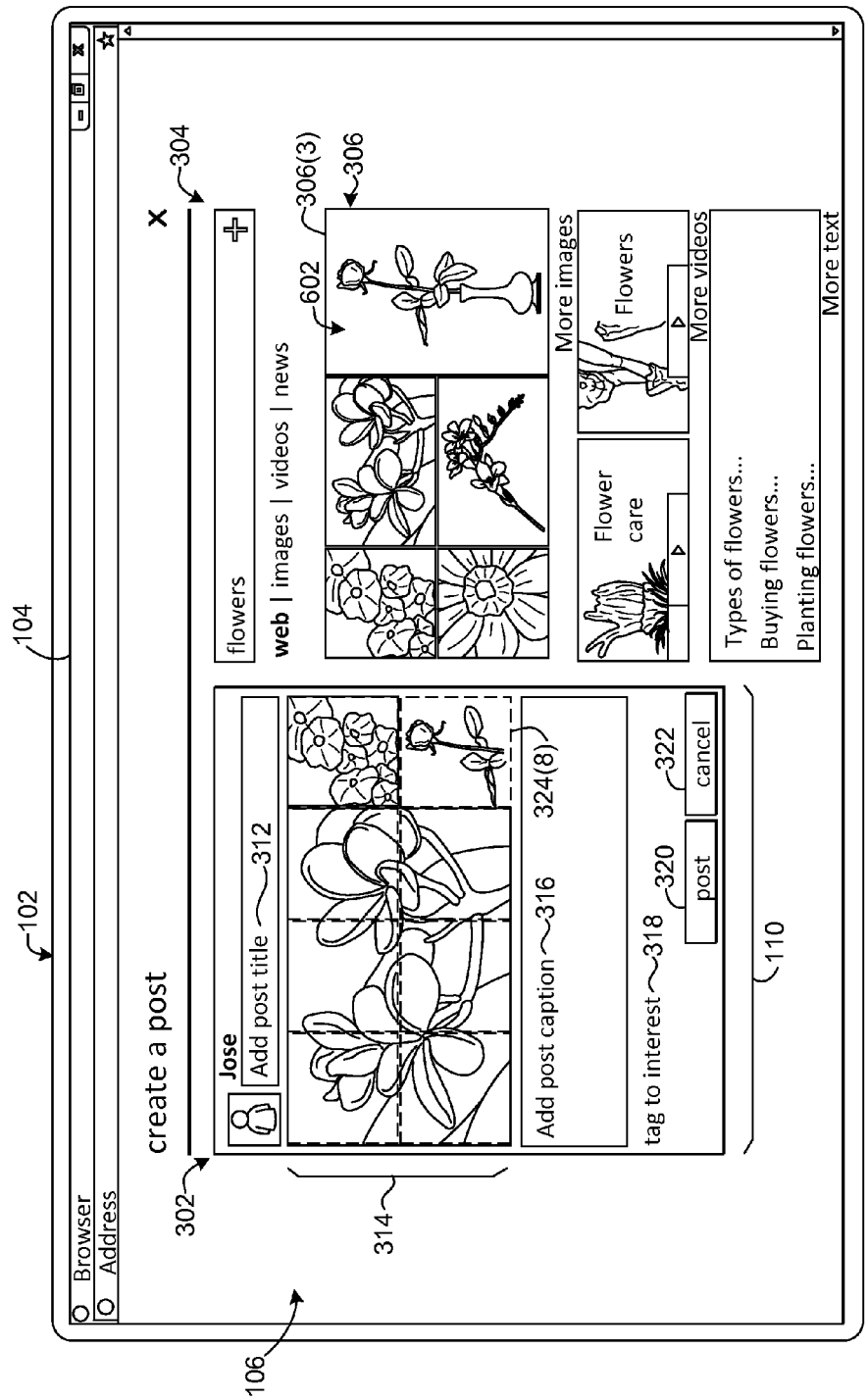
Figure 7:
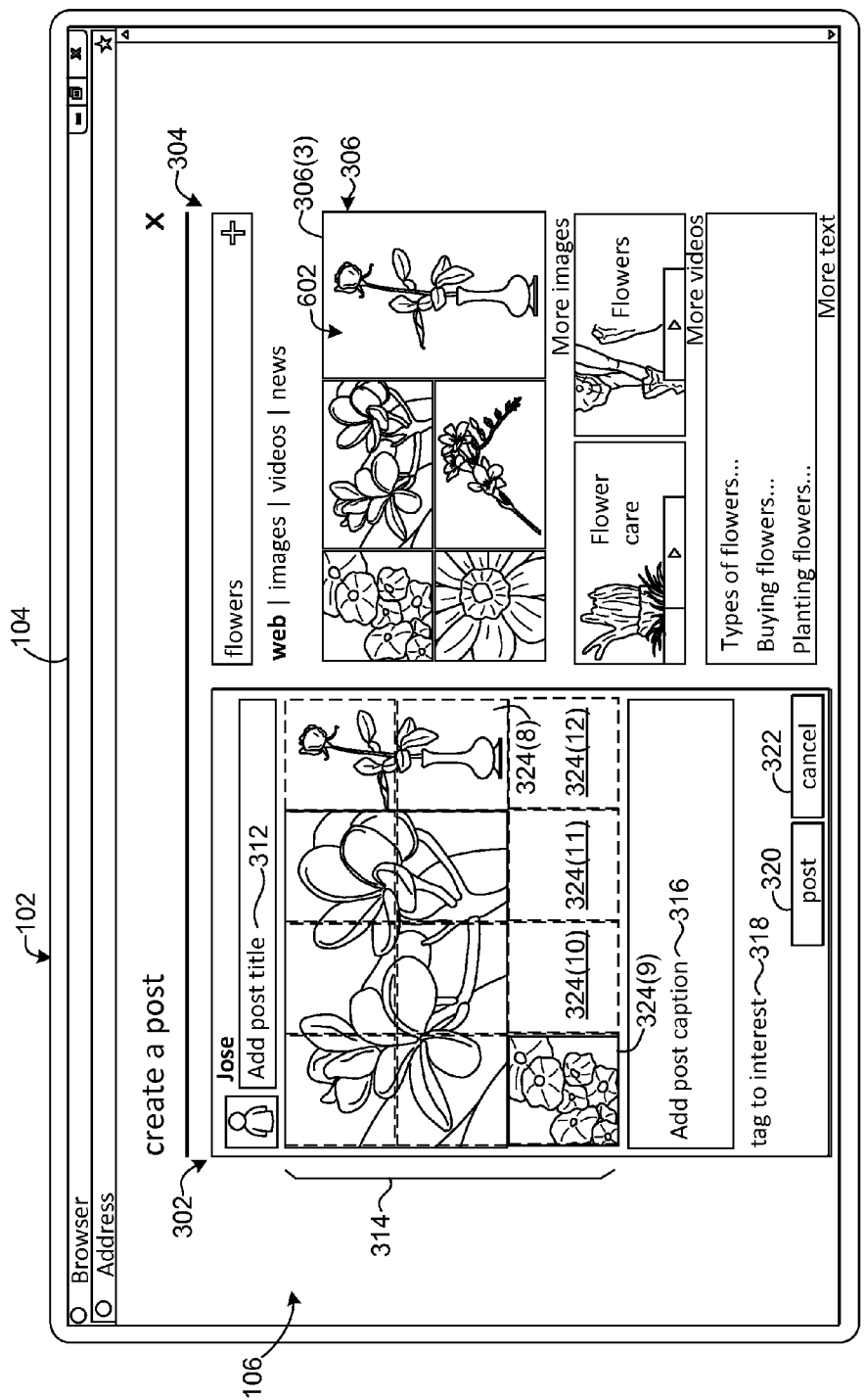

FIGS. 6-7 show two alternative configurations for populating another user selection of image 306(3).

In the implementation of FIG. 6, the user selected image 306(3) is cropped to fit into the final available rectangle 324(8). Thus, there are no empty rectangles left on the grid 326 of the collage template 314.

FIG. 7 shows an alternative configuration to that of FIG. 6. In this case, the aspect ratio of the image 602 is compared to the aspect ratio of the rectangles 324. The aspect ratio of the image can be compared to the aspect ratio of the individual rectangles, the aspect ratio of multiple rectangles taken collectively, and/or which rectangles are available. In this case, the aspect ratio of the image is similar to two horizontally stacked rectangles. Further, only one rectangle (324(8)) is available (e.g., unfilled). As such, this implementation added another row of rectangles 324(9)-324(12) to the grid 326 of the collage template 314. Image 306(1) is then moved from rectangle 324(4) to new rectangle 324(9). Image 306(3) is positioned onto rectangles 324(4) and 324(8).

Figure 8:
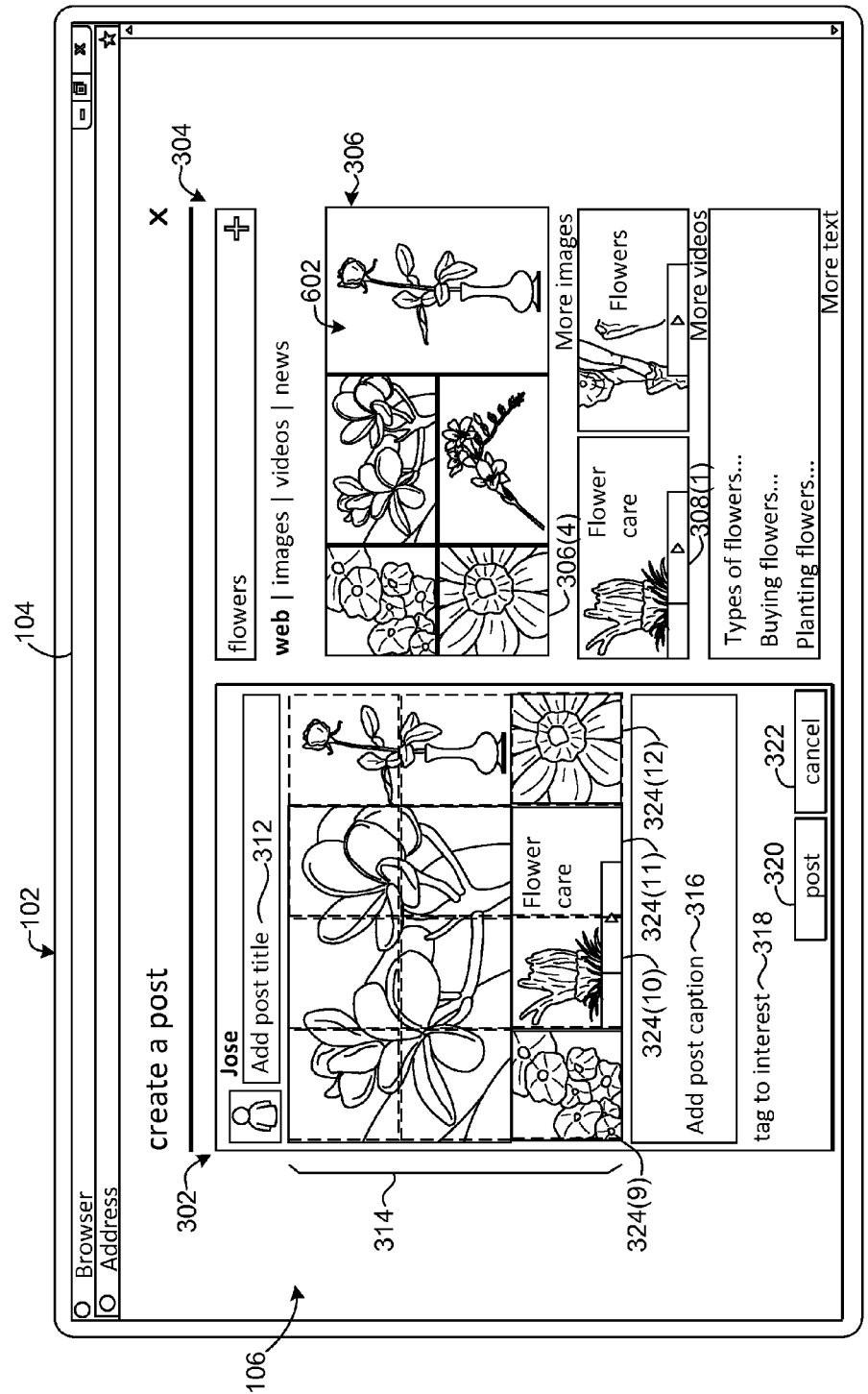

FIG. 8 continues with the scenario of FIG. 7. In this case, the user subsequently selected video 308(1) and image 306(4). The video 308(1) is populated onto rectangles 324 (10) and 324(11) and the image 306(4) is populated onto rectangle 324(12).

Figure 9:
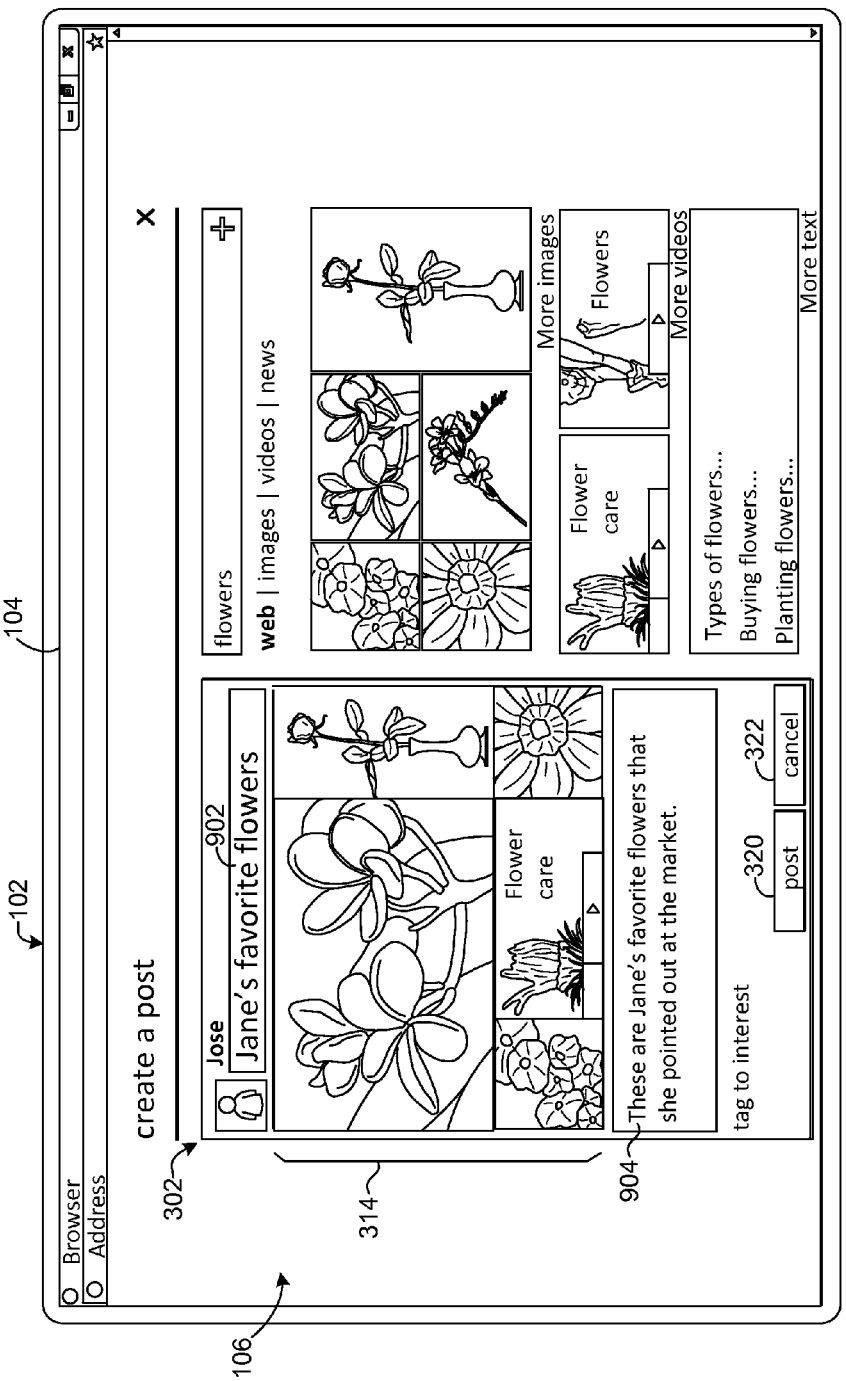

FIG. 9 shows the addition of a visual post title of "Jane's favorite flowers" at 902 and a visual post caption of "These are Jane's favorite flowers that she pointed out at the market" at 904. FIG. 9 also shows the rectangles removed from the collage template 314 to aid visualization. At this point assume that the user is ready to post the draft visual post at 320.

Figure 10:
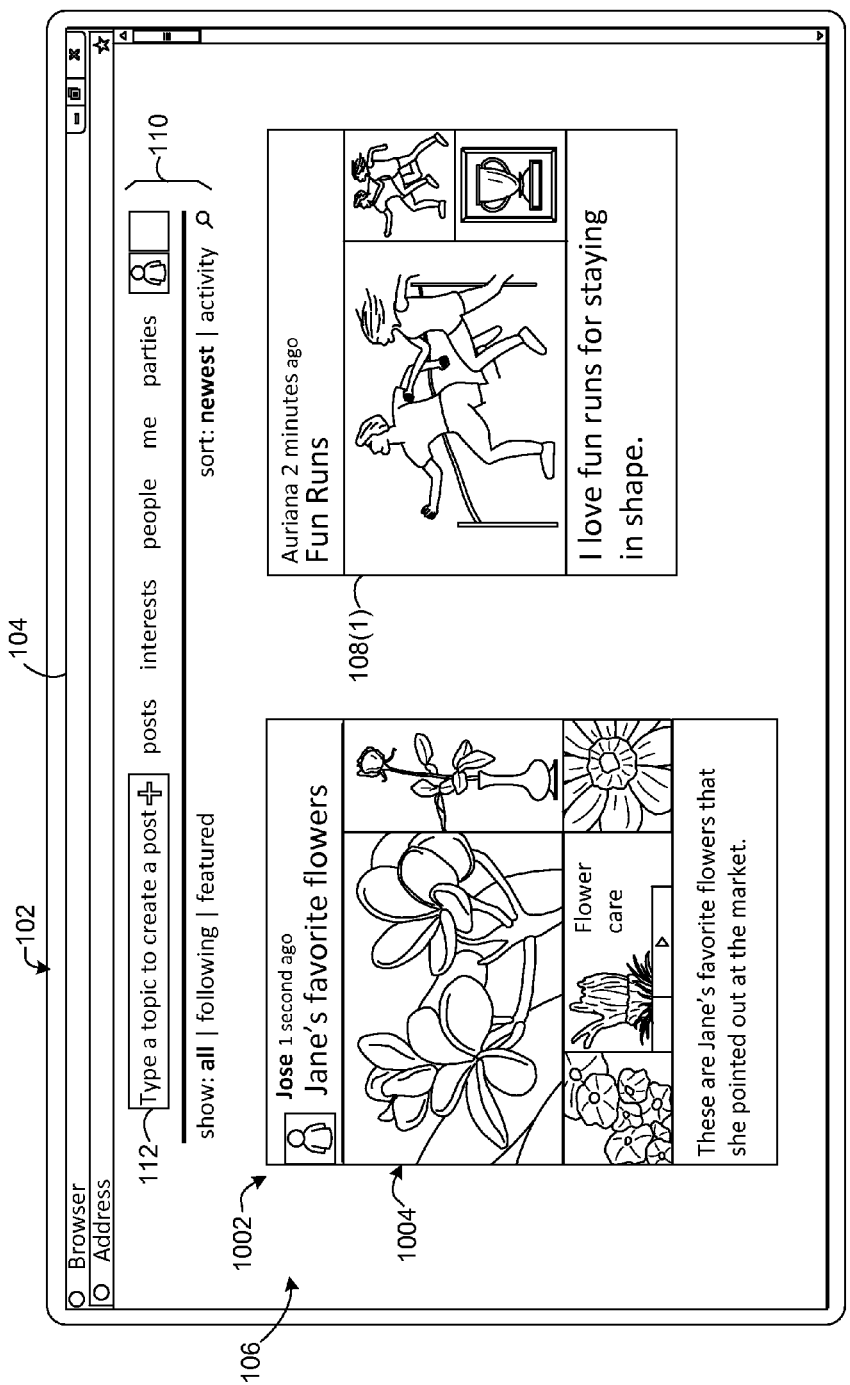

FIG. 10 shows the results where the draft visual post created by the user is now visual 'post' 1002 which is added to the most recent posts for viewing. In this case, visual post 108(2) is no longer visible on the GUI 106 and visual post 108(1) is shifted to the right to make room for visual post 1002.

Visual post 1002 includes a collage 1004 derived from the collage template of FIG. 9. In summary, by simply entering a topic for a visual post, selecting content from listed content, and entering text as desired, the user can create an attractive visual post containing a collage. Note that the collage is visually appealing in that the horizontal and vertical edges of the content are aligned (e.g., defined by the rectangles described above relative to FIGS. 3-9).

Figure 11:
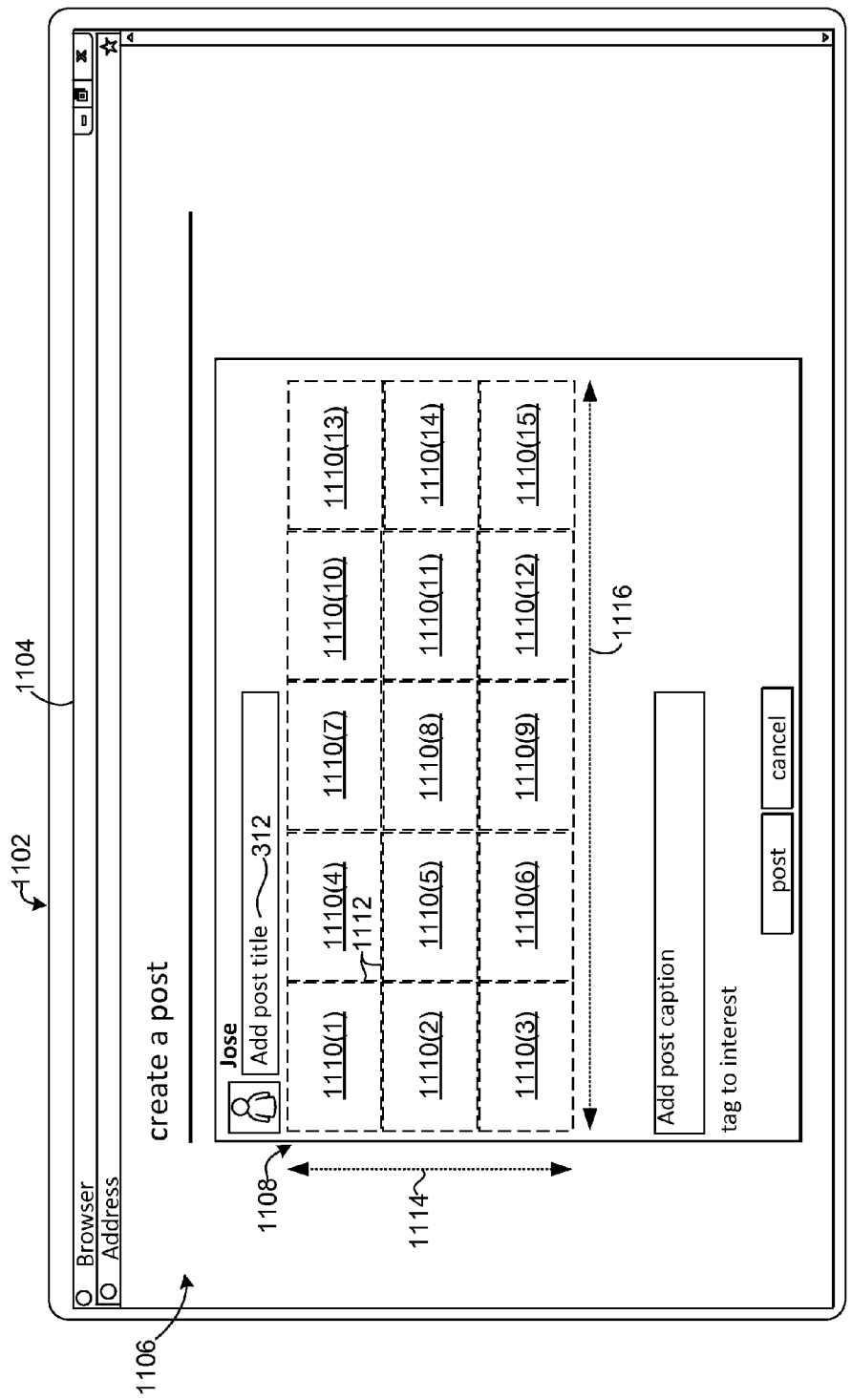

FIG. 11 illustrates some detail about collage template variations. FIG. 11 illustrates a device 1102 that has a display 1104. A GUI 1106 can be presented on the display 1104 to allow collage creation. GUI 1106 includes a collage template 1108 that includes rectangles 1110 oriented in a grid 1112. In this case the collage template 1108 is bound in the vertical direction as indicated at 1114 (e.g., limited to three horizontal rows of rectangles. However, the collage template is adjustable in the horizontal direction as indicated at 1116 (e.g., more columns of rectangles can be added). Further, in this case, rather than being square, the rectangles 1110 have an aspect ratio that approximates the aspect ratio of many display devices (e.g., 16:9 or other value). In this example, the default for populating the rectangles follows the subscripts of the rectangles (e.g., (1), (2), etc.). Stated another way, the default for populating the rectangles is top-to-bottom on the leftmost column, top-to-bottom on the next column to the right, etc. Of course, the size and/or aspect ratios of the selected images can affect or over-ride the default. For example, if the first selected content has a 'landscape' orientation, the content may be populated in rectangles 1110(1) and 1110(4), for example.

Recall that in FIGS. 3-10, the collage template 314 included rows of four rectangles (squares in that case) each. The default configuration was to fill the collage template left-to-right and top-to-bottom. The default configuration was flexible to allow the shapes of the content selected for the collage template to be considered. The overall width of the collage template was fixed to four rectangles, but the height of the template was dynamic (e.g., more rows could be added). In some cases, the shape of the selected content over-rode the default configuration (e.g., see FIG. 9).

In some configurations, the dimensions of the collage template can affect or define the number and/or dimensions of the rectangles. In other configurations, the dimensions of the rectangles can affect or define the dimensions of the collage template. In an example of the former case, design parameters may set the overall width of the collage template at 400 pixels and specify four rectangles per row. In that case, the rectangles can then have a horizontal width of 100 pixels. In an example of the latter configuration, the width of the rectangles can be set at 100 pixels. Thus, the overall width of the post section can be 400 pixels. Note also that some configurations can include a gutter or border between the rectangles. For instance, the border may be one pixel wide, among other values. As such in the above example, the four 100 pixel wide rectangles separated by one pixel between adjacent rectangles would define a collage template width of 403 pixels. Specific examples are described above. Of course, other numbers of rectangles and dimensions of rectangles and collage templates are contemplated.

System Examples

Figure 12:
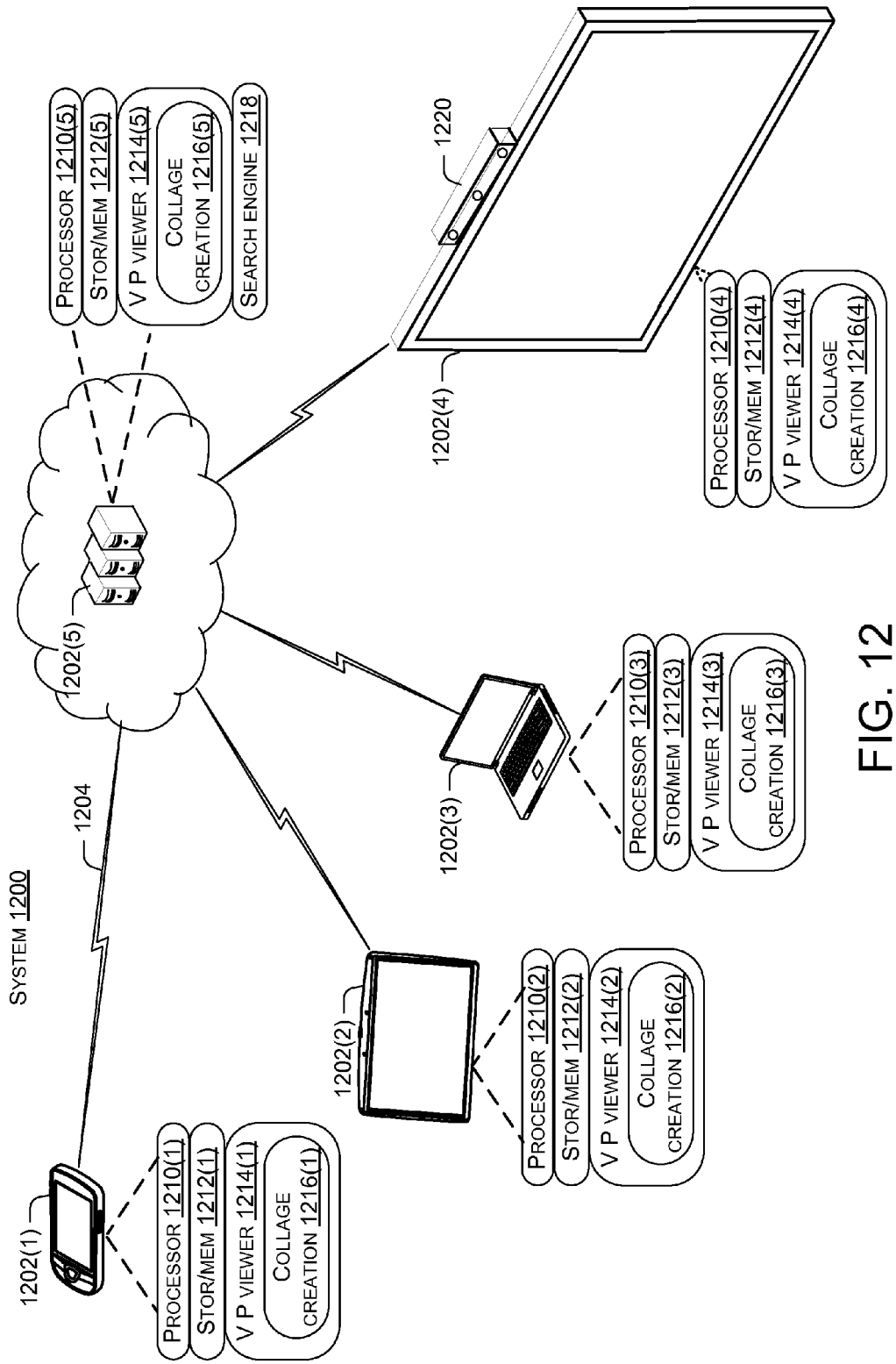
FIG. 12 illustrates an example of a system which can support visual post building functionalities in accordance with some implementations of the present concepts.

FIG. 12 shows system 1200 that can enable visual post building concepts described above. In this example, the system 1200 includes several devices. In this case, the devices are manifest as a smartphone type computer 1202(1), a pad type computer 1202(2), a notebook type computer 1202(3), a smart TV type computer 1202(4), and a set of cloud-based server type computers 1202(5). Pad type computer 1202(2) can be similar to devices 102 and 1102 introduced above relative to FIGS. 1 and 11, respectively. (In this discussion, the use of a designator with the suffix, such as "(1)", is intended to refer to a specific device instance. In contrast, use of the designator without a suffix is intended to be generic). Of course not all device implementations can be illustrated and other device implementations should be apparent to the skilled artisan from the description above and below.

The devices 1202 can communicate over one or more networks 1204 (represented by 'lightning bolts'). Devices 1202 can include several elements which are defined below. For example, these devices can include a processor 1210, storage/memory 1212, and/or a visual post (VP) viewer component 1214. The visual post viewer component can include a collage creation module 1216. The visual post viewer component 1214 and collage creation module 1216 can allow the user to accomplish the functionalities described above relative to FIGS. 1-11. The devices can alternatively or additionally include other elements, such as input/output devices (e.g., touch, voice, and/or gesture recognition), buses, graphics cards, Wi-Fi circuitry, cellular circuitry, positional circuitry (absolute location (e.g., GPS)), and/or relative location (accelerometers, magnetometers, among others) etc., which are not illustrated or discussed here for sake of brevity.

The term "device", "computer", or "computing device" as used herein can mean any type of device that has some amount of processing capability and/or storage capability. Processing capability can be provided by one or more processors (such as processor 1210) that can execute data in the form of computer-readable instructions to provide a functionality. Data, such as computer-readable instructions, can be stored on storage, such as storage/memory 1212 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices 1202 can include traditional computing devices, such as personal computers, desktop computers, notebook computers, cell phones, smart phones, personal digital assistants, pad type computers, mobile computers, cameras, or any of a myriad of ever-evolving or yet to be developed types of computing devices. A mobile computer can be any type of computing device that is readily transported by a user and may have a self-contained power source (e.g., battery).

In the illustrated implementation devices 1202 are configured with a general purpose processor 1210 and storage/memory 1212. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices suitable for implementation both in conventional computing architectures as well as SOC designs.

In some configurations, the visual post viewer component 1214 can be installed as hardware, firmware, or software during manufacture of the device 1202 or by an intermediary that prepares the device for sale to the end user. In other instances, the end user may install the visual post viewer component 1214, such as in the form of a downloadable application or from a storage media. Further, in some instances individual devices 1202 can include a robust visual post viewer component 1214. In other cases individual devices may have a less robust or thin visual post viewer component 1214 where a majority of the functionality is performed by other devices, such as cloud-based devices, for presentation on the thin device. In some cases, the local device (e.g., the user's device) can provide a web-view of content generated remotely, such as by the cloud-based devices.

Stated another way, in some implementations, an individual device, such as device 1202(1) may have a less robust instance of the visual post viewer component 1214(1) such that some or all of the functionality provided by the visual post viewer component 1214(1) is performed remotely, such as at cloud-based device 1202(5) and communicated back to device 1202(1) for presentation to the user.

As introduced above, the visual post viewer component 1214 can enable the user to create a collage using one-click selection of results from user-driven searches over the web, news, images, movies, etc. For example, when the user enters a topic (e.g., search term(s)) the visual post viewer component 1214 can access a search engine 1218 to obtain search results. When the user selects any particular item from the search results, the visual post viewer component 1214 can automatically start the layout of a visual post as a collage template. As the user adds new items to the collage template, the post viewer component can employ algorithms that can re-evaluate the layout of the collage template to provide a more aesthetically pleasing presentation of the user's selected (e.g., added) items.

The visual post viewer component 1214 can allow the user to repeat the search query in-line by refining their result set in specific directions with visual post construction continually available to elaborate on a theme of selected images or other media. The user's previous visual posts can also be available as source media for the one-click construction of derived works. The repeated one-click authoring can be particularly well-suited for mobile and tablet touch-enabled platforms where manual configurations tend to be impractical.

The visual post viewer component 1214 can automatically incorporate multiple types of media into the same visual layout (e.g., the collage template). The addition of images into a collage template typically requires the efforts of somebody with an artistic slant to prepare the image for "production" by cropping it and understanding how it fits into the whole visual composition. In contrast, the visual post viewer component 1214 can reduce some of these aspects to heuristics that allow the algorithms to work in concert with the user so that the user can now focus on their primary task of the selection of items for inclusion in the collage template.

The visual post viewer component 1214 can treat Images as a primary source for rich visual posts. In one example the post viewer component can apply heuristics so that the selected image can "span" the width of the collage template. In such a case, the algorithms may automatically select the image as a primary image for the collage. The visual post viewer component 1214 can also crop images to fit the image into the grid of the collage template. In such a case, the visual post viewer component 1214 can crop the image based on the aspect ratio and contents of the image. For example, if a face is detected in the image, the image can be cropped to highlight the face.

For sets of user selected images, the visual post viewer component 1214 and the collage creation module 1216 can achieve visual balance to maintain symmetry in the collage. Further, the collage creation module can consider dominant hues in the imagery and can adjust the placement of similar colored images in the collage template.

In an instance where the user clicks on a web link, the collage creation module 1216 can add rich information from the target web page to the collage template, including the page's title, description, and/or other images. The collage creation module 1216 can allow the user to play movies inline with surrounding content, such as images, selected by the user. This configuration can be more appealing than blindly starting movies when the web page is loaded. As a result, the visual post viewer component 1214 can obtain a set of movies in an ordered manner in time to play sequentially. The visual post viewer component can highlight the currently played movie and enable the passive viewing experience of a continuous feed of content curated by an inspired user.

In some configurations, the collage creation module 1216 can support any type of content for user-selection to the collage template. Examples of other types of content can include thumbnails of the post's author, user annotations such as "likes" and usage statistics. The collage creation module 1216 can support animated gifs, twitter tweets, and other varieties of content. In fact, some of the content could be interactive—voice messages or other composed works can be left for other users.

The collage creation module 1216 can support dynamic layout of the collage template. Stated another way, the collage creation module can provide automatic layout of the user selections into the collage template. However, the collage creation module can allow the user to change the layout as desired. For instance, the user can delete individual selected content, move content (e.g., drag-and-drop), and/or swap content locations in the collage template. Some implementations can also offer the user a shuffle feature. For instance, the user may like the content he/she picked for the collage, but many not like the layout selected by the collage creation module. The user can utilize the shuffle feature to have the content rearranged. The user can continue to select the shuffle feature until he/she is satisfied with the content arrangement.

Further, collage creation module 1216 can keep the layout flexible after the collage is posted. For instance, when displaying the collage on different form factors, the post viewer component 1214 can reapply the layout algorithm to generate the collage in more appropriate dimensions. In particular, the collage can easily be reformatted for mobile devices. When comments from other users are added to the collage, those comments can be incorporated into the visual layout by the visual post viewer component 1214.

In one such example, while a collage may be created on a device having a relatively small display area, the collage may subsequently be displayed on a device that has a relatively large display area and/or has a different display aspect ratio. The device having the large display area may display the collage differently than the device having the small display area. For instance, a collage could be generated by collage creation module 1216(1) of smart phone device 1202(1). This collage may subsequently be viewed on smart TV device 1202(4). The smart TV device's visual post viewer component 1214(4) may display the collage differently. For example, the visual post viewer component 1214(4) may be configured for a home entertainment cinematic experience intended for a living room milieu.

In this form, the automation performed by visual post viewer component 1214(4) may consider the placement of media on the display area and the timed presentation of a series of media for enjoyment, such as when viewed from a couch positioned in front of the smart TV device. For example, the visual post viewer component 1214(4) can adjust the placement and sequence of media in time based on the duration of videos and count of images within the collage. Furthermore, the authoring experience offered by collage creation module 1216(4) can be geared toward the living room milieu. For instance, in addition to search-driven sourcing of content to present to the user for inclusion in the collage, the content can be selected from 3rd party integration into the living room hardware, such as a gaming or entertainment console.

In this entertainment scenario, the collage creation module 1216(4) can emphasize content from smart TV 1202(4), such as content from television channels, DVD players, and/or other input signals. For example, rather than relying on generic search results, the visual post viewer component 1214(4) and the collage creation component 1216(4) can include recently displayed images/video with, or in lieu of, other content, such as search results for user selection as elements of a collage.

In another configuration, the collage creation component 1216(4) can automatically arrange recently displayed content images, video, etc., onto a collage template. The recently displayed content could be augmented with other content, such as trailers for a movie that is being watched. This other content could be obtained from the search engine to augment the 'personalized' content populated onto the collage template. Thus, the collage creation component 1216(4) can automatically populate a collage template with content that offers a synopsis of what the user just viewed and related information. For instance, assume for purposes of explanation that the user is watching the movie "The Avengers." The collage creation component 1216(4) can automatically populate images and/or video from the movie into a collage template. The collage creation component can also obtain other information, such as posters of The Avengers and populate the posters into the collage template. The user could then simply post this automatically generated collage template. Alternatively, the user could modify or otherwise contribute to the collage template.

In one case, collage creation component 1216(4) can be coupled to a gesture recognition device 1220. The user could then select and/or modify content of the collage template by making gestures and/or voice commands. Such a configuration can be achieved with a Microsoft® Xbox® entertainment console with Kinect®, among other competing, developing, or yet to be developed products.

Method Examples

Figure 13:
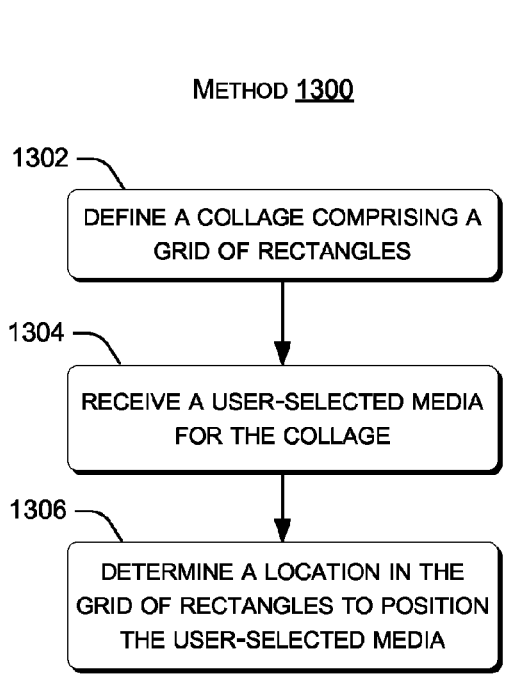
FIGS. 13-15 show examples of visual post building methods in accordance with some implementations of the present concepts.

FIG. 13 shows a flowchart of a method 1300 relating to visual post building.

At block 1302, the method can define a collage comprising a grid of rectangles. In one case, the defining can entail defining an overall width of the collage and a number of rectangles on a row of the grid and sizing the rectangles to satisfy the width. In another case, the defining can entail defining a width of individual rectangles of the collage and a number of rectangles on a row of the grid.

At block 1304, the method can receive a user-selected media for the collage. Examples of user-selected media can include an image, a graphics interchange format (GIF), a video, or text, among others.

At block 1306, the method can determine a location in the grid of rectangles to position the user-selected media (e.g., content) and a number of the rectangles to occupy with the user selected media in the collage. In some cases, the determining can be based upon one or more of: a resolution of the user selection, an aspect ratio of the user selection, or whether the user selection was a first user selection or a subsequent user selection.

Figure 14:
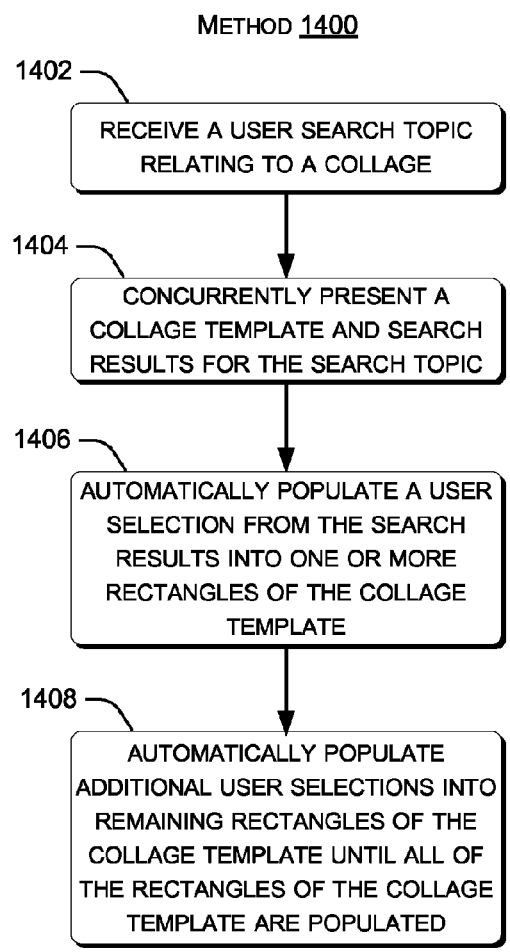

FIG. 14 shows a flowchart of another method 1400 relating to visual post building.

At block 1402, the method can receive a user search topic relating to a collage. For example, a graphical user interface can be displayed for the user that presents other collages. The GUI can include a text box into which the user can enter the user search topic.

At block 1404, the method can concurrently present a collage template and search results for the search topic. The collage template can be based upon a grid of equal sized rectangles. In one example described above, the collage template and the search results can be concurrently presented side-by-side on the GUI.

At block 1406, the method can automatically populate a user selection from the search results into one or more rectangles of the collage template. In some cases, an aspect ratio of the user selection can be determined. The aspect ratio of the user selection can be compared to an aspect ratio of the equal sized rectangles. In an instance where the aspect ratio of the user selection is greater than the aspect ratio of the equal sized rectangles (such as 150% greater), the user selection can be automatically populated into at least two of the equal sized rectangles that are horizontally adjacent. In an instance where the aspect ratio of the user selection is less than the aspect ratio of the equal sized rectangles (such as 50% or less), the user selection can be populated into at least two of the equal sized rectangles that are vertically adjacent (e.g., stacked).

At block 1408, the method can automatically populate additional user selections into remaining rectangles of the collage template until all of the rectangles of the collage template are populated or the user indicates that the collage is complete. In some implementations, the automatically populating additional user selections can be performed left to right on the collage template or top to bottom on the collage template, among other configurations.

Figure 15:
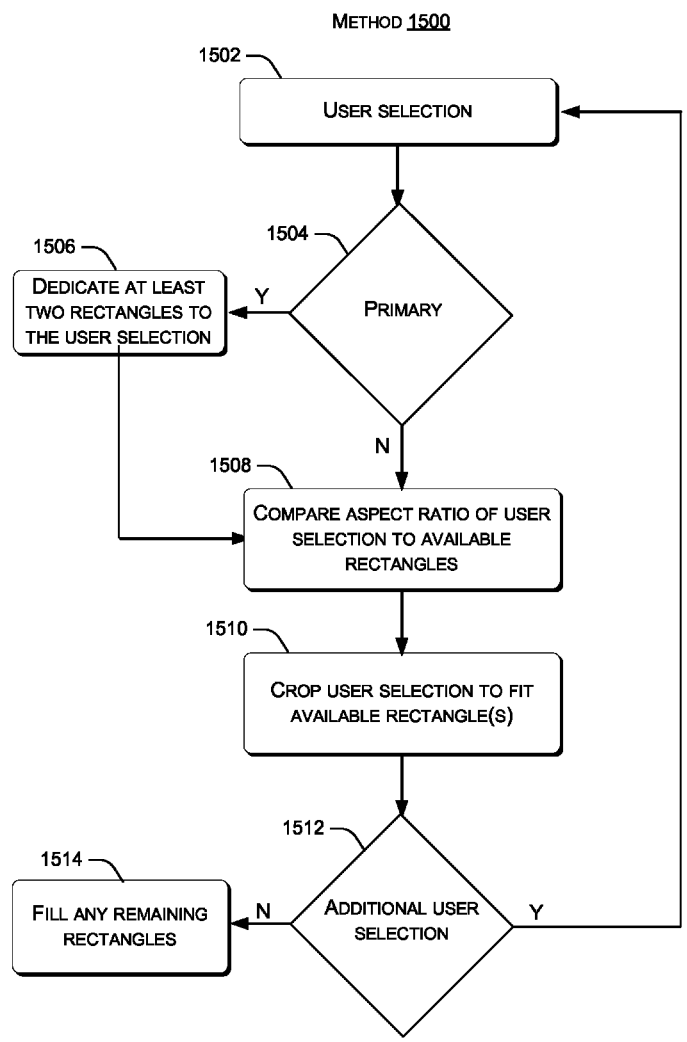

FIG. 15 shows a flowchart of a method 1500 relating to visual post building. This particular method relates to positioning user selected items on rectangles of the collage template.

At block 1502, the method can receive a user selected item or element. Examples of items are described above and can include images, GIFs, videos, and texts, among others.

At block 1504, the method can determine whether the user selected item is a primary item. Some implementations can default to treating the first user selected item as the primary item. Other implementations can consider the size of the user selected item and choose a relatively large item for the primary item. Other implementations may not utilize a 'primary item' and may simply treat all of the items the same. In an instance where the user selected item is the primary item, the method can proceed to block 1506. Otherwise the method can proceed to block 1508.

At block 1506, the method can dedicate at least two rectangles of the collage template to the primary item. The method then proceeds to block 1508.

At block 1508, the method can compare an aspect ratio of the user selected item to the aspect ratio of the rectangles and determine which rectangles are available for the user selected item in the collage template. As mentioned above, some implementations start populating items onto the rectangles starting at the left side of the top row and proceeding across that row and then to the next row. If the aspect ratio of the selected item is within a threshold range of the aspect ratio of the first available rectangle then the selected item can be added to that rectangle. For instance, if the aspect ratio of the selected item is between 60% and 140% of the aspect ratio of the first available rectangle then the selected item can be added to that rectangle. If the aspect ratio is outside of the threshold range, then the selected item can be added to multiple available rectangles. For instance, if the selected item's aspect ratio is 200% of the rectangles' aspect ratio then the selected item can be positioned on the first two available adjacent rectangles (e.g., landscape orientation). If the aspect ratio of the selected item is less than 50% of the aspect ratio of the rectangles then the selected item can be positioned on two vertically adjacent (e.g., stacked) rectangles.

This process may be able to be completed by following the default assignment order (e.g., top row left-to-right, etc.). However, in some cases, assignment of the selected item may override the default assignment order. For example, if only one rectangle is available on the first row and the selected item has an aspect ratio greater than 150% of the aspect ratio of the rectangles, then the selected item may be positioned on the left side of the second row.

At block 1510, the method can crop the user selected item to fit the assigned available rectangle(s). Various cropping algorithms can be used. The cropping algorithms may be used in combination with other technologies. For instance, face recognition technologies may be applied to the user selected item. If a face is identified in the user selected item, a different cropping algorithm can be applied to the item. For instance, cropping may be performed relative to (e.g., centered on) the face rather than relative to the center of the item.

At block 1512, the method can wait for additional user selections. If an additional user selection is received, the method can return to block 1502. If no user selections are received within a defined period of time or if prompted by the user, the method can proceed to block 1514.

At block 1514, the method can fill any remaining rectangles to give the collage template a 'finished' appearance. In one case, the primary image can be expanded in the background of the collage template so that it covers the entire collage template. In such a configuration, the primary image in the background only appears in 'unused' rectangles. Of course, other techniques for enhancing the finished appearance of the collage template can be employed. In another implementation, the method may wait for user input before taking any action. For instance, the method may wait for the user to select to post the collage template. At that point, the method can populate any remaining rectangles or otherwise enhance a finished appearance of the collage.

In summary, the present concepts can offer automatic layout of collages and rich visual posts with a very "low barrier to entry" to post creation. The present concepts can also surface inline content from nontraditional avenues, such as a television show or movie the user is watching. The concepts can also provide different presentations of the same collage for different form factors and styles (e.g., a cinematic experience). Further, the concepts can capture user intent related to collage creation gesture-detection technologies.

The order in which the methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on computer-readable storage medium/media as a set of instructions such that execution by a computing device causes the computing device to perform the method.

CONCLUSION

Although techniques, methods, devices, systems, etc., pertaining to visual posts are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-implemented method, comprising:
   receiving a user search topic;
   concurrently presenting, on a display of a computing device, a collage template and search results for the user search topic, wherein the collage template comprises a grid of rectangles comprising a collage;
   automatically populating a first user-selected search result in a portion of the rectangles of the grid, a number and a relative positioning of the rectangles of the portion being based at least in part on a first aspect ratio of the first user-selected search result;
   subsequent to the automatically populating the first user-selected search result, automatically populating a second user-selected search result in the grid by repositioning the first user-selected search result based at least on a second aspect ratio of the second user-selected search result; and,
   automatically populating additional user-selected search results into unpopulated rectangles of the grid.

2. The computer-implemented method of claim 1, wherein the receiving comprises receiving at a graphical user interface that presents other collages and includes a text box into which a user can enter the user search topic.

3. The computer-implemented method of claim 1, wherein the concurrently presenting comprises concurrently presenting the collage template and the search results side-by-side on a GUI.

4. The computer-implemented method of claim 1, wherein the automatically populating the additional user-selected search results comprises cropping at least one of the additional user-selected search results based at least in part on another aspect ratio of the unpopulated rectangles of the grid.

5. The computer-implemented method of claim 1, further comprising increasing a number of the rectangles of the grid in response to a further user-selected search result.

6. The computer-implemented method of claim 5, further comprising increasing the number of the rectangles of the grid rather than repositioning previously selected search results based at least in part on another aspect ratio of the further user-selected search result.

7. The computer-implemented method of claim 1, wherein the automatically populating additional user-selected search results is performed left to right on the collage template or top to bottom on the collage template.

8. The computer-implemented method of claim 1, further comprising allowing a user to manually change a position of individual user-selected search results in the collage template.

9. The computer-implemented method of claim 1, further comprising offering a user a shuffle option and, responsive to a user selection of the shuffle option, changing positions of the first user-selected search result, the second user-selected search result, and the additional user-selected search results in the collage template.

10. A system, comprising:
    a display;
    a processor; and
    a storage device storing computer-readable instructions which, when executed by the processor, cause the processor to:
    receive a user search topic;
    concurrently present, on the display, a collage template and search results for the user search topic, wherein the collage template comprises a grid of rectangles representing a collage;
    automatically populate a first user-selected search result in a portion of the rectangles of the grid, a number and a relative positioning of the rectangles of the portion being based at least in part on a first aspect ratio of the first user-selected search result;
    subsequent to automatically populating the first user-selected search result, automatically populate a second user-selected search result in the grid by repositioning the first user-selected search result based at least on a second aspect ratio of the second user-selected search result; and,
    automatically populate additional user-selected search results into unpopulated rectangles of the grid.

11. The system of claim 10, wherein the computer-readable instructions further cause the processor to:
define the collage by defining an overall width of the collage and a number of rectangles on a row of the grid and sizing the rectangles to satisfy the overall width.

12. The system of claim 10, wherein the computer-readable instructions further cause the processor to:
define the collage by defining a width of individual rectangles of the collage and a number of rectangles on a row of the grid.

13. The system of claim 10, wherein the first user-selected search result comprises an image, a graphics interchange format (GIF) file, a video, or a selection of text.

14. The system of claim 10, wherein the computer-readable instructions further cause the processor to:
automatically populate the first user-selected search result by determining the number and the relative positioning of the rectangles based at least in part on an order of selection of the first user-selected search result compared to other user-selected search results.

15. The system of claim 10, wherein the computer-readable instructions further cause the processor to:
create a graphical user interface (GUI) on the display, the GUI comprising the collage and further comprising an action area; and,
receive the user search topic via the action area.

16. The system of claim 15, wherein the computer-readable instructions further cause the processor to:
present search results corresponding to the user search topic on the GUI; and,
receive a user selection of the first user-selected search result from the presented search results.

17. The system of claim 10, embodied on a mobile device or embodied on an entertainment console.

18. At least one computer-readable storage medium having instructions stored thereon that, when executed by a computing device, cause the computing device to perform acts, the acts comprising:
receiving a user search topic;
concurrently presenting, on a display of the computing device, a collage template and search results for the user search topic, wherein the collage template comprises a grid of rectangles representing a collage;
automatically populating a first user-selected search result in a portion of the rectangles of the grid, a number and a relative positioning of the rectangles of the portion being based at least in part on a first aspect ratio of the first user-selected search result;
subsequent to the automatically populating the first user-selected search result, automatically populating a second user-selected search result in the grid by repositioning the first user-selected search result based at least on a second aspect ratio of the second user-selected search result; and,
automatically populating additional user-selected search results into unpopulated rectangles of the grid.

19. The at least one computer-readable storage medium of claim 18, the acts further comprising:
determining whether the first user-selected search result is a primary item; and,
determining the number and the relative positioning of the rectangles based at least in part on whether the first user-selected search result is determined to be the primary item.

20. The at least one computer-readable storage medium of claim 18, the acts further comprising:
updating the collage by populating remaining rectangles of the grid with additional items, the additional items being media items.

* * * * *